SAYRE & KLINCK.
Cultivator Tooth.
No. 3,477. Reissued June 1, 1869.
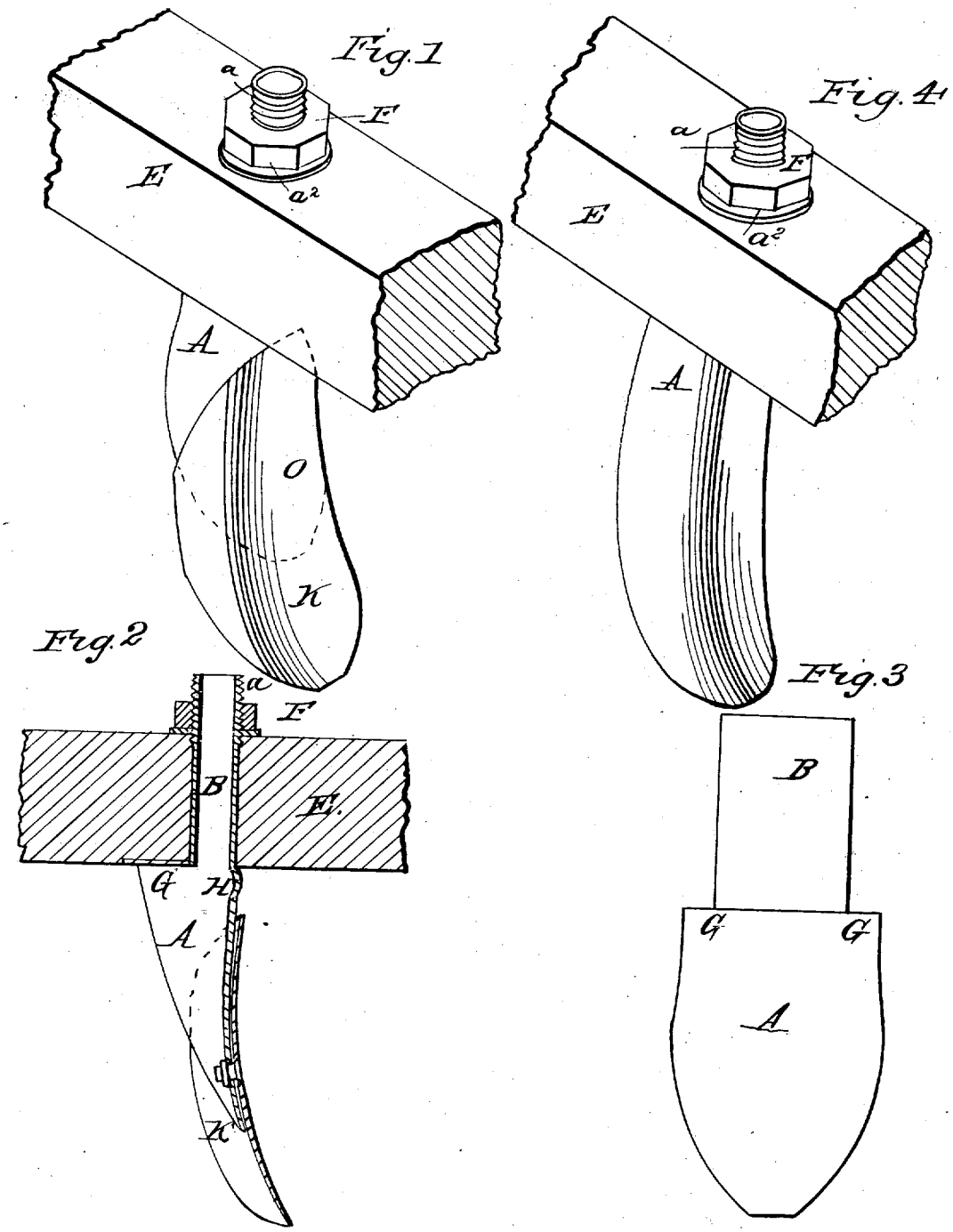
N. PETERS. Photo-Lithographer, Washington, D. C.

UNITED STATES PATENT OFFICE.

CHARLES H. SAYRE (FOR HIMSELF) AND THE REMINGTON AGRICULTURAL WORKS, ASSIGNEES, BY MESNE ASSIGNMENTS, OF CHARLES H. SAYRE AND GEORGE KLINCK, OF UTICA, NEW YORK.

IMPROVEMENT IN CULTIVATOR-TEETH.

Specification forming part of Letters Patent No. 14,254, dated February 12, 1856; Reissue No. 3,477, dated June 1, 1869.

*To all whom it may concern:*

Be it known that we, CHARLES H. SAYRE, and the REMINGTON AGRICULTURAL WORKS, of Utica, in the county of Oneida and State of New York, are the owners of certain Letters Patent for an Improvement in Cultivator-Teeth, granted to CHARLES H. SAYRE and GEORGE KLINCK, of said Utica, on the 12th day of February, 1856; and we do hereby declare the following to be a full, clear, and exact description of the same, reference being had to the accompanying drawings, which make part of this specification, and in which—

Figure 1 represents a view in perspective of one of our improved teeth, having a reversible point applied thereto, the tooth being attached to the frame, which is represented as broken off; Fig. 2, a vertical longitudinal section of the same, taken centrally through Fig. 1. Fig. 3 represents the blank tooth as cut out of a sheet of metal preparatory to being swaged into shape; and Fig. 4 represents a view in perspective of our improved tooth attached to the frame, without having a reversible point applied thereto.

The nature of our invention consists in making a tooth with a hollow or tubular shank from thin or sheet metal, on which is cut a screw-thread, through which it is secured to the frame by means of a nut or its equivalent.

To strengthen and support the shank, there are two braces in rear and a raised bead in front, they being severally formed on that end brought in contact with the under side of the rail or frame, so as to form a shoulder or bearing on every side, which, being firmly drawn up to the frame by means of the nut and screw, prevent it from working loose, and yield the necessary strength to resist pressure. The plate A and shank B are first cut out of a sheet of metal in one piece of the proper shape, and then swaged into the necessary form for a tooth, the shank being bent round, so as to form a hollow tube or cylinder. On the upper end of this shank, which passes through a mortise in the beam E, is cut a screw-thread, *a*, through which the tooth is secured to the frame by means of the nut F.

On the upper end and at the rear of the plate A are two shoulders, G, formed by cutting off the upper portion of the plate from the lower preparatory to forming the tubular shank, and which, together with the bead H, form a shoulder in front and rear of the shank.

To prevent the shoulder G from cutting the under side of the frame, a piece or plate of metal may be let into the frame, to form a bearing for them. On the upper side of the frame, between it and the nut F, is placed a washer, $a^2$, for a like purpose.

On the plate A, Fig. 1, is represented a reversible point or tooth, K, which may be made of any required shape or size. This point is secured to the plate by means of a screw-bolt, its head being made slightly convex on the surface and tapering on its under side, to fit into a countersunk mortise through the point K and plate A.

What we claim as the invention of SAYRE and KLINCK, and desire to secure by Letters Patent, is—

1. So constructing a cultivator-tooth that when made of thin or sheet metal a part thereof will form a tubular shank, B, whereby said tooth may be drawn up and securely attached to the frame, substantially as described.

2. Forming shoulders or braces G from sheet metal by bending or swaging it, substantially as and for the purpose set forth.

3. A cultivator-tooth made from sheet metal in such a manner as to form braces G and tubular shank B, substantially as described.

4. A cultivator-tooth made of sheet metal so as to form a tubular shank, B, and brace G, in combination with the nut F, screw-thread *a*, and plate A, substantially as and for the purpose described.

CHAS. H. SAYRE.
REMINGTON AGR. WORKS,
BY J. C. DEONUX,
*Secty. and Treasr.*

Witnesses:
A. GWINGINGER,
THOMAS GEARY.